United States Patent [19]

Inaba

[11] Patent Number: 4,781,568
[45] Date of Patent: Nov. 1, 1988

[54] MOLD CLAMPING UNIT OF INJECTION MOLDING MACHINE

[75] Inventor: Yoshiharu Inaba, Kawasaki, Japan

[73] Assignee: Fanuc Ltd., Minamitsuru, Japan

[21] Appl. No.: 933,638

[22] PCT Filed: Feb. 21, 1986

[86] PCT No.: PCT/JP86/00084
  § 371 Date: Oct. 21, 1986
  § 102(e) Date: Oct. 21, 1986

[87] PCT Pub. No.: WO86/04857
  PCT Pub. Date: Aug. 28, 1986

[30] Foreign Application Priority Data
  Feb. 22, 1985 [JP] Japan ................... 60-32846

[51] Int. Cl.⁴ ............... B29C 45/06; B22D 17/26
[52] U.S. Cl. ............................... 425/451; 72/454; 100/290; 164/303; 164/306; 164/312; 425/451.7
[58] Field of Search ............ 425/406, 450.1, 451, 425/451.7, 525, 589, 594, 100; 100/290; 72/454; 164/303, 306, 312

[56] References Cited

U.S. PATENT DOCUMENTS

| | | | |
|---|---|---|---|
| Re. 32,048 | 12/1985 | Prince | 164/312 |
| 2,164,245 | 6/1939 | Kienzle | 425/406 |
| 2,484,344 | 10/1949 | Hiller et al. | 425/589 |
| 2,711,561 | 6/1955 | Stüdli | 425/589 |
| 3,346,925 | 10/1967 | Maier | 425/589 |
| 3,890,081 | 6/1975 | Grundmann | 425/450.1 |
| 4,188,877 | 2/1980 | Khan | 100/290 |
| 4,387,635 | 6/1983 | Abbestam et al. | 100/290 |
| 4,540,359 | 9/1985 | Yamazaki | 425/135 |
| 4,608,848 | 9/1986 | Mele | 72/184 |

FOREIGN PATENT DOCUMENTS 56-49238 5/1981 Japan.
56-49237 5/1981 Japan.
59-2827 1/1984 Japan.

*Primary Examiner*—Willard E. Hoag
*Attorney, Agent, or Firm*—Staas & Halsey

[57] ABSTRACT

Molds are mounted on a front platen and a moving platen. A plurality of ball screws are mounted between the front platen and the rear platen at equal distances from centers of the molds and at predetermined angular intervals. Ball nuts threadedly engaged with the plurality of ball screws, respectively, are mounted on the moving platen. A servo motor drives to move the moving platen in the axial direction of the ball screws through the ball screws and the ball nuts. A mold clamping force is generated by a stress occurring in the ball screws when the molds are closed.

8 Claims, 2 Drawing Sheets

MOLD CLAMPING UNIT OF INJECTION MOLDING MACHINE

TECHNICAL FIELD

The present invention relates to a mold clamping unit of an injection molding machine.

DESCRIPTION OF THE RELATED ART

Mold clamping units of injection molding machines open/close a mold and clamp the mold. Conventional injection molding machines use a hydraulic drive source for driving the mold clamping units. The mold clamping force is generated by extension of a tie-bar between rear and moving platens. Since a hydraulic drive source is used, the mold clamping operation is difficult to control, and the arrangements of the hydraulic unit and the selector valve are complex. In addition, an ejector unit must be provided in the mold clamping section to take up a mold product, and these mold clamping and ejector units must be arranged normally among four tie-bars. When the injection molding machine is large and has a large output, a sufficient space is reserved for these units and no problem occurs. When the injection molding machine is small, however, the space for a mold clamping section is small, and the mount position for the ejector unit and so on is limited.

SUMMARY OF THE INVENTION

It is an object of the present invention to simplify the structure of a mold clamping unit of an injection molding machine and increase a space for a mold clamping section to facilitate mounting of an ejector unit and so on, thus providing a compact mold clamping unit having a small number of components.

In order to achieve the above objects, according to the present invention, a plurality of ball screws are mounted between front and rear platens at equal distances from centers of molds mounted on the front and moving platens and at predetermined angular intervals. Ball nuts mounted on the moving platen are threadedly engaged with the ball screws. A servo motor moves the moving platen along the ball screws through the ball screws and the ball nuts, and opens/closes and clamps the mold. When the mold is to be clamped, the mold clamping force is generated by a stress caused in the ball screws.

In this manner, according to the present invention, a servo motor is used as a drive source for the mold clamping unit. Tie-bars which are conventionally used to generate a mold clamping force are eliminated. The moving platen is moved forward/backward by the servo motor. The ball screws for moving the mold forward/backward are used in place of the tie-bars. A stress generated in the ball screws upon mold clamping is utilized to clamp the mold. Therefore, the structure of the mold clamping unit is simplified, the number of components is decreased, and a large space can be reserved for the mold clamping section, thus facilitating mounting of the ejector unit and so on.

DESCRIPTION OF THE PREFERRED EMBODIMENT

Figure 1:
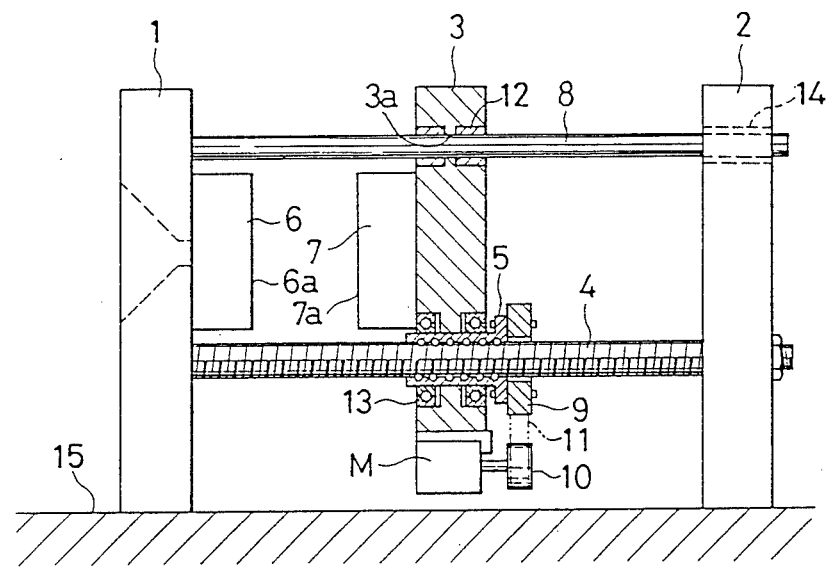
FIG. 1 is a front view of a mold clamping section of an injection molding machine according to a first embodiment of the present invention.
Figure 2:
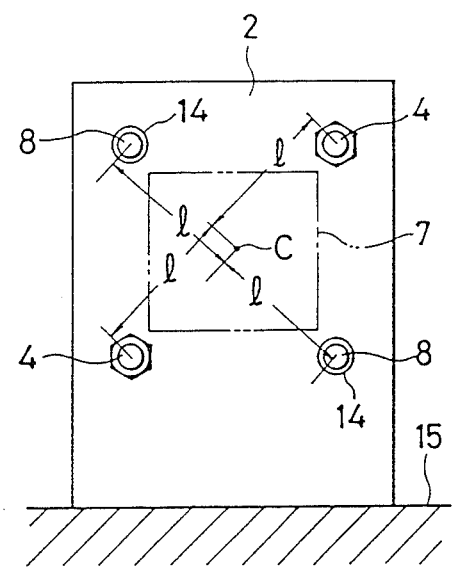
FIG. 2 is a right side view of the mold clamping section shown in FIG. 1.

FIGS. 1 and 2 show a mold clamping unit of an injection molding machine according to a first embodiment of the present invention. Referring to FIGS. 1 and 2, reference numeral 1 denotes a front platen; and 2, a rear platen. The front and rear platens 1 and 2 are fixed on a base 15 of the injection molding machine. Two guide rods 8 and two ball screws 4 are fixed between the front and rear platens 1 and 2. The guide rods 8 are fixed on the rear platen 2 through bushings 14 so as to be slidable along the axial direction.

As shown in FIGS. 1 and 2, molds 6 and 7 are mounted on the front platen 1 and a moving platen 3 respectively. The two ball screws 4 are arranged to be symmetrical (with an angular interval of 180°) with each other about centers c of contact surfaces 6a and 7a of the molds 6 and 7, and to be spaced apart at equal distances l from each other. The two guide rods 8 are also symmetrical with each other in the same manner as in the case with the screws 4. Ball nuts 5 threadedly engaged with the ball screws 4 are pivotally fixed on the moving platen 3 through bearings. Toothed pulleys 9 are fixed on the ball nuts 5. A servo motor M is fixed to the moving platen 3. A toothed pulley 10 is fixed on the motor shaft of the servo motor M. A toothed belt 11 extends among the toothed pulleys 10 and 9. The guide rods 8 extend through holes 3a formed in the moving platen 3. The moving platen 3 is guided by the guide rods 8 through bushings 12 and moves to the right and left in FIG. 1.

With the above arrangement, when the servo motor M is rotated in the forward direction to drive the toothed pulley 10, the toothed belt 11, and the toothed pulleys 9, the ball nuts 5 fixed on the toothed pulleys 9 are rotated to move the moving platen 3 forward (to the left in FIG. 1) along the ball screws 4. When the molds 6 ad 7 are closed and the servo motor M is further rotated in the forward direction, the molds 6 and 7 are clamped. By the reaction force of the clamping force, portions of the ball screws 4 between the front and moving platens 1 and 3 are pulled and portions thereof between the moving and rear platens 3 and 2 are compressed. These tensile and compressive stresses of the ball screws 4 clamp the molds 6 and 7. The clamping force is controlled by controlling the torque of the servo motor M.

This embodiment can be modified in the following manner. More specifically, the ball screws 4 are fixed to be incapable of sliding relative to either one of the front and rear platens 1, 2 and to be axially slidable relative to the moving platen 3. Then, the molds 6 and can be clamped by either tensile or compressive stress generated in the fixed halves of the ball screws 4.

Figure 3:
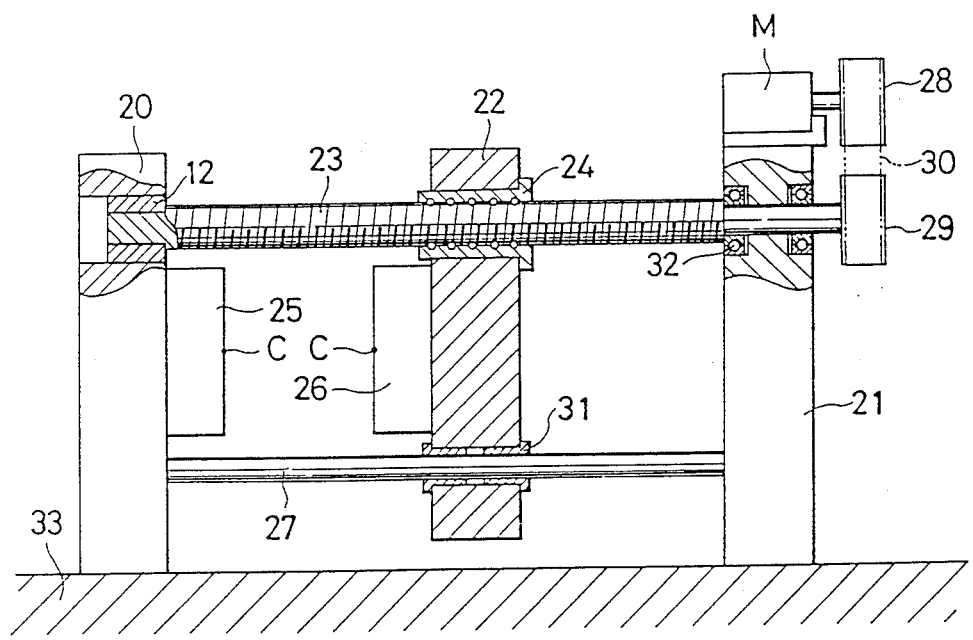
FIG. 3 is a front view of a mold clamping section according to a second embodiment of the present invention.

FIG. 3 shows a second embodiment of the present invention. In a similar manner as in the first embodiment, front and rear platens 20 and 21 are fixed on a base 33 of an injection molding machine. In a similar manner as in the first embodiment (refer to FIG. 2), two ball screws 23 and two guide rods 27 are mounted between the front and rear platens 20 and 21. The ball screws 23 are symmetrical (with an angular interval of 180°) with each other about centers c of mold mounting surfaces at equal distances. The guide rods 27, which are also arranged symmetrically with respect to the centers c, are fixed on the front and rear platens 20 and 21. Unlike the first embodiment, the ball screws 23 are fixed on the rear platen 21 to be pivotal (rotatable) but still incapable of moving in the axial direction, and on the front platen 20 through sliding bearings 12 to be movable in the axial direction. Ball nuts 24 threadedly engaged with the ball screws 23 are fixed on the moving platen 22. The moving platen 22 is slidably engaged with the guide rods 27 through bushings 31 and is guided by the guide rods 27. Toothed pulleys 28 and 29 are fixed on the distal ends of a servo motor M and the ball screws 23. Power of the servo motor M is transmitted to the toothed pulleys 29 through the toothed pulley 28 via a toothed belt 30. Molds 25 and 26 are fixed on the front and moving platens 20 and 22, respectively.

With the above arrangement, the servo motor M is rotated in the forward left direction to drive the toothed pulley 28. Then, the toothed pulleys 29 are rotated through the toothed belt 30 and rotate the ball screws 23. Therefore, the ball nuts 24 threadedly engaged with the ball screws 23 are moved forward (to the left in FIG. 3). The moving platen 22 to which the ball nuts 24 are fixed is guided by the guide rods 27 to move forward, and the molds 25 and 26 are closed. When the servo motor M is further rotated in the forward direction, the molds 25 and 26 are clamped. A reaction force of the clamping force compresses the ball screws 23 at their portions extending between the moving and rear platens 22 and 21 through the moving platen 22 and the ball nuts 24. The clamping force of the molds 25 and 26 is maintained by the compressive stress. When the molds 25 and 26 are clamped, end portions of the ball screws 23 slide in the holes in the front platen 20 through the sliding bearings 12. Therefore, no stress occurs in the ball screws 23 extending between the front and moving platens 20 and 22.

As described above, the clamping force for the molds 25 and 26 is controlled by controlling the torque of the servo motor M and hence the compression degree of the ball screws 23.

In the first and second embodiments, two ball screws are used. However, the number of the ball screw is not limited to two. An arbitrary number, e.g., 3, 4, 5 . . . , of ball screws can be provided at equal distances with respect to centers c of the mold mounting surfaces of the molds to be mounted on the front and moving platens, and at equal angular intervals in the radial direction.

In the second embodiment, the ball screws 23 are mounted on the front platen 20 through the sliding bearings. However, fixed bearings which support shafts in a manner permitting relative rotation between the bearings and the shafts but not permitting relative axial movement therebetween can be used instead. In this case, a tensile or compressive stress is generated in the ball screws 23 during mold clamping, in the same manner as in the first embodiment.

I claim:

1. A mold clamping unit of an injection molding machine comprising:
   a fixed rigid front platen;
   a fixed rigid rear platen;
   a plurality of guide rods mounted between said front and rear platens;
   a plurality of ball screws mounted between said front and rear platens so as to uniformly distribute a received stress as a clamping force;
   a movable platen mounted on said guide rods and said ball screws;
   first and second molds mounted on facing surfaces of said front platen and said movable platen, respectively, said ball screws and said guide rods being mounted between said front and rear platens at equal distances from centers of said molds at predetermined angular intervals;
   a plurality of ball nuts, one corresponding to each of said ball screws, pivotally mounted on said movable platen and threadedly engaged with said ball screws;
   a servo motor mounted on said movable platen at a location away from said molds so as to provide the received stress; and
   coupling means for operatively connecting said servomotor to said ball nuts so that said servo motor moves said movable platen axially with respect to said ball screws, through said ball nuts, for opening and closing said molds, said coupling means being spaced apart from said movable platen.

2. A mold clamping unit of an injection molding machine according to claim 1, wherein said coupling means comprises a plurality of pulleys, one connected to each of said servo motor and said ball nuts, and
   a toothed belt connected said pulleys for transmitting power of said servo motor to said ball nuts for rotating said ball screws to move said movable platen.

3. A mold clamping unit of an injection molding machine according to claim 1, wherein opposite ends of said ball screws are fixed to said front and rear platens, respectively, and said guide rods each have one end arranged to be slidable relative to one of said front and rear platens.

4. A mold clamping unit of an injection molding machine according to claim 1, wherein said ball screws each have one end fixed to one of said front and rear platens and another end arranged to be slidable relative to the other of said front and rear platens, and said guide rods each have one end arranged to be slidable relative to one of said front and rear platens.

5. A mold clamping unit of an injection molding machine comprising:
   a fixed front platen;
   a fixed rear platen;
   a plurality of ball screws mounted rotatably between said front and rear platens;
   a plurality of guide rods mounted between said front and rear platens;
   a moving platen having a plurality of fixed ball nuts mounted fixedly therethrough, one corresponding to and threadedly engaged with each of said ball screws, so that said moving platen is axially movable on said ball screws and said guide rods;
   first and second molds mounted on facing surfaces of said front platen and said moving platen, respectively, said ball screws and said guide rods being mounted between said front and rear platens at equal distances from centers of said molds at predetermined angular intervals;
   servo motor means mounted on said rear platen; and
   coupling means for operatively connecting said servo motor means to said ball screws, said servo motor means being operable to rotate said ball screws through said coupling means, so as to drive said moving platen so that said molds are opened and closed, said coupling means being disposed adjacent a surface of said rear platen opposite from said moving platen, a clamping force being produced by a stress generated in said ball screws when the molds are closed.

6. A mold clamping unit of an injection molding machine according to claim 5 wherein said coupling means comprises a plurality of pulleys, one rotatably connected each of said servo motor means and said ball screws, and a toothed belt rotatably connecting said pulleys for transmitting power of said servo motor means to said ball crews for rotating said ball screws and moving said moving platen.

7. A mold clamping unit of an injection molding machine according to claim 5, wherein opposite ends of said ball screws are each fixed to said front and rear platens, respectively.

8. A mold clamping unit of an injection molding machine according to claim 5, wherein said ball screws each have one end fixed to one of said front and rear platens and another end arranged to be slidable relative to the other of said front and rear platens.

* * * * *